(12) United States Patent  (10) Patent No.: US 8,310,376 B2
Frank et al.  (45) Date of Patent: Nov. 13, 2012

(54) OBJECT CLASSIFICATION METHOD, PARKING ASSISTANCE METHOD, AND PARKING ASSISTANCE SYSTEM

(75) Inventors: Michael Frank, Bretten (DE); Petko Faber, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 12/733,458

(22) PCT Filed: Jul. 18, 2008

(86) PCT No.: PCT/EP2008/059485
§ 371 (c)(1),
(2), (4) Date: Jul. 13, 2010

(87) PCT Pub. No.: WO2009/030554
PCT Pub. Date: Mar. 12, 2009

(65) Prior Publication Data
US 2010/0302069 A1  Dec. 2, 2010

(30) Foreign Application Priority Data
Sep. 5, 2007 (DE) .......................... 10 2007 042 220

(51) Int. Cl.
*B60Q 1/48* (2006.01)
(52) U.S. Cl. ...................... 340/932.2; 340/903; 340/933; 340/425.5; 340/435; 340/436

(58) Field of Classification Search ............... 340/932.2, 340/903, 933, 425.5, 435, 436, 437
See application file for complete search history.

(56) References Cited

U.S. PATENT DOCUMENTS
2007/0263901 A1* 11/2007 Wu et al. .................... 382/104
2008/0143085 A1*  6/2008 Breed et al. ................. 280/735
2010/0241314 A1*  9/2010 Bohm et al. .................. 701/41

FOREIGN PATENT DOCUMENTS
DE  42 08 595    5/1993
DE  103 23 639  12/2004
EP  1 562 050    8/2005
EP  1 643 271    4/2006
EP  1 764 630    3/2007

* cited by examiner

*Primary Examiner* — Daryl Pope
(74) *Attorney, Agent, or Firm* — Kenyon & Kenyon LLP

(57) ABSTRACT

An object classification method in which a vehicle moves toward an object includes: (a) ascertaining a first characteristic quantity from the variation of a first signal received by a distance-measuring sensor; (b) ascertaining an additional characteristic quantity from the variation of a second signal received by the distance-measuring sensor; (c) ascertaining a distance traveled by the vehicle between step (a) and step (b); (d) ascertaining a predictive quantity associated with the distance ascertained in step (c); (e) comparing the predictive quantity with the additional characteristic quantity; and (f) generating an object classification signal.

11 Claims, 6 Drawing Sheets

OBJECT CLASSIFICATION METHOD, PARKING ASSISTANCE METHOD, AND PARKING ASSISTANCE SYSTEM

BACKGROUND OF THE INVENTION

1. Field of the Invention

The present invention relates to an object classification method, a parking assistance method, and a parking assistance system for outputting parking instructions to a driver of a vehicle.

2. Description of Related Art

The increasing traffic density and more and more development of open spaces are reducing the traffic space continuously, in particular in metropolitan areas. The available parking space is becoming scarcer, and the search for suitable parking spaces, in addition to the constantly increasing traffic, puts stress on the driver. Therefore, systems for locating parking spaces and semi-autonomous parking assistance systems have been developed to support the driver in parking. This makes it easier or unnecessary for the driver to make a decision of whether an existing parking space is sufficient for a parking operation, and the parking assistance system delivers warning signals which help the driver in parking into the parking space.

Within such a parking assistance system, a classification of the objects delimiting the roadway or the parking space (e.g., curb, parked cars, etc.) into objects that may and objects that may not be driven over is desirable. Such a classification makes it possible, for example, to properly adjust the parking trajectory and the final position of the vehicle. For example, it would be possible to let the rear end protrude during the parking operation over objects classified as objects that may be driven over or even to use the space taken up by objects classified as objects that may be driven over as a parking space.

In this context, published German patent document DE 103 23 639 A1 describes a method, according to which the signals received from objects classified as very low (e.g., split gravel or small pebbles) are treated as interference signals and the sensitivity parameters of the sensor device are modified to prevent the detection of these interference signals. However, this method is suitable only for taking into account or filtering definitely low objects, but not for making a distinction in general between objects that may and objects that may not be driven over.

It is furthermore known that the height of an object changes certain characteristic quantities of the signal received by the parking assistance system. For example, a taller object usually results in a higher signal amplitude and a wider echo pulse. However, it has been found that characteristic quantities of this type depend on weather conditions and on the shape and structure of the object, so that the use of such characteristic quantities has previously not been possible for making reliable qualitative estimates of the height of the object.

There is thus a need for an improved classification of objects into objects that may and objects that may not be driven over, for example, in a parking assistance system for supporting a parking operation of a vehicle.

BRIEF SUMMARY OF THE INVENTION

Accordingly, in accordance with the present invention, an object classification method is provided for classifying an object, in particular in a parking assistance method for supporting a parking operation of a vehicle, in which the vehicle moves toward the object, the object classification method having the following steps:

(a) ascertaining a first characteristic quantity from the variation of a signal received by a distance-measuring sensor;

(b) ascertaining another characteristic quantity from the variation of a signal received by a distance-measuring sensor;

(c) ascertaining a distance traveled by the vehicle between step (a) and step (b);

(d) ascertaining a predictive quantity from the ascertained first characteristic quantity, the predictive quantity being associated with the distance ascertained in step (c);

(e) comparing the predictive quantity with the additional characteristic quantity ascertained in step (b); and (f) generating an object classification signal associated with the object, which has a first state if the predictive quantity is less than the additional characteristic quantity and which has a second state if the predictive quantity is greater than or equal to the additional characteristic quantity.

A corresponding parking assistance system for supporting a parking operation of a vehicle in which the vehicle moves toward an object has the following:

a distance-measuring sensor, which periodically transmits a signal from the vehicle toward the object and receives a signal reflected by the object;

a program-controlled device, which ascertains a first characteristic quantity from the variation of a signal received by the distance-measuring sensor;

ascertains an additional characteristic quantity from the variation of a signal received by the distance-measuring sensor;

ascertains a distance traveled by the vehicle between the points in time when the first and the second characteristic quantities were ascertained;

ascertains a predictive quantity from the first ascertained characteristic quantity, the predictive quantity being associated with the additional ascertained distance;

compares the predictive quantity with the additional characteristic quantity; and generates an object classification signal associated with the object, which has a first state if the predictive quantity is less than the actual characteristic quantity and which has a second state if the predictive quantity is greater than or equal to the actual characteristic quantity.

The present invention is based on the idea of using the change, by location, of a characteristic quantity of the received signal as indicator for qualitative information about the height of an object, in particular on whether it may be driven over.

Although such a qualitative information may be obtained, in principle, even on the basis of one comparison of two received signal curves ascertained at different locations, it is, however, advantageous if above-described steps (b) through (f) are periodically repeated, since this makes a continuous check of the susceptibility of an object to being driven over in the area detected by the sensor possible.

In one advantageous refinement, the method according to the present invention has the following additional steps:

(g) ascertaining whether the series of consecutively ascertained characteristic quantities has a local maximum, and (h) generating an object classification signal associated with the object, having the first state if it is ascertained that the series of consecutively ascertained actual characteristic quantities has a local maximum.

In this way, objects that may be driven over may be correctly classified even at an earlier point in time during the parking operation.

In step (d), the predictive quantity may be ascertained from a mathematical linkage to an attenuation factor. For example, the predictive quantity may be determined in step (d) essentially by multiplying the first characteristic quantity ascertained in step (a) by a factor $e^{kx}$, k being the attenuation factor and x being the distance ascertained in step (c). It is thus taken into account that certain characteristic quantities have an exponential relationship with the distance between sensor and object.

It is advantageous to set the attenuation factor (k) as a function of the weather conditions. This makes a more accurate classification possible. Examples of weather conditions include ambient temperature, atmospheric pressure, and precipitation.

The characteristic quantity may provide, for example, the amplitude of a local maximum in the received signal, in particular a local maximum of the first echo pulse. Another possible characteristic quantity is the pulse width of the first echo pulse. It is also possible to first submit a plurality of received signals ascertained by different sensors or by the same sensor to a statistical analysis and then to use a statistical quantity (for example, a standard deviation of the amplitude of the first echo pulse, a mean value, or the like) as the characteristic quantity.

The information (in the form of the object classification signal) ascertained using the object classification method may be used in a parking assistance method or further processed. Such a parking assistance method according to the present invention for supporting a parking operation of a vehicle includes the above-described object classification method and has the following additional steps:

(i) determining an instantaneous distance of the vehicle from the object, and (j) outputting a warning signal if the instantaneous distance is less than a minimum distance, the minimum distance being a function of the state of the object classification signal.

The distance-measuring sensor is advantageously provided in a rear area or in a frontal area of the vehicle.

A computer program according to the present invention has program code means for executing all steps of a method as described above when the program is executed on a computer or an arithmetic unit.

DETAILED DESCRIPTION OF THE INVENTION

Figure 1:
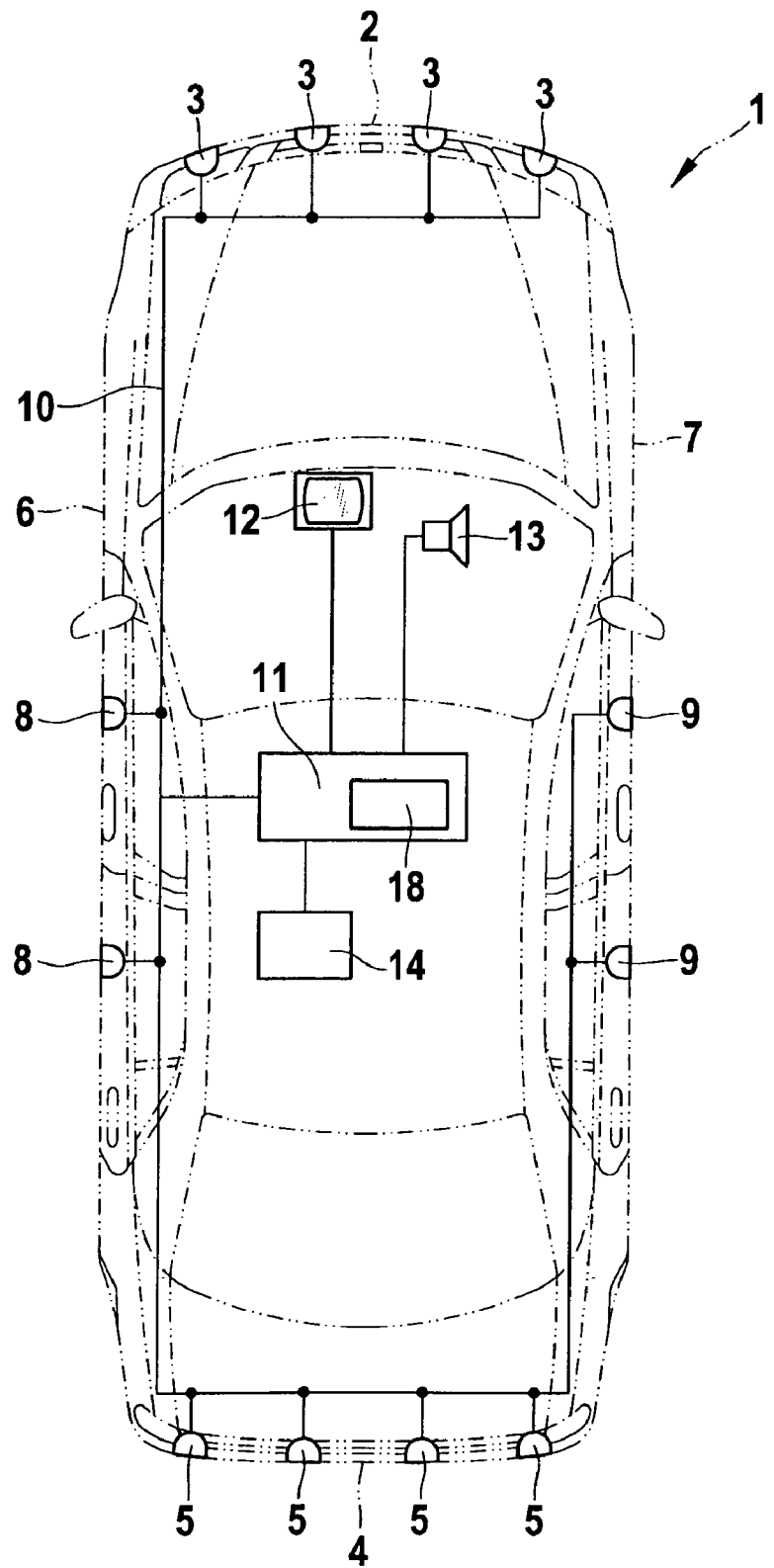
FIG. 1 shows a schematic diagram of a vehicle having a parking assistance system according to one example embodiment of the present invention.

In all figures of the drawings, identical elements or elements having the same function are provided with the same reference numeral, unless indicated otherwise.

FIG. 1 shows a schematic diagram of a vehicle having a parking assistance system according to a specific embodiment of the present invention. Distance sensors 3 are situated on a front side 2 of vehicle 1. Distance sensors 5 are also situated on a rear side 4 of the vehicle. Other lateral distance sensors 8 may be provided on a left side 6 of the vehicle and lateral distance sensors 9 may be provided on a right side 7 of the vehicle. The distance sensors are used for measuring distances to obstacles in the surroundings of the vehicle. In the present specific embodiment, distance sensors 3, 5, 8, 9 may be designed as ultrasound sensors. Distance sensors 3, 5, 8, 9 deliver their sensor signals, via a data bus 10, to a program-controlled device 11 (for example, a microprocessor, microcontroller, or the like), having a memory 18 in vehicle 1. On the basis of the sensor signals supplied by distance sensors 3, 5, 8, 9, program-controlled device 11 ascertains distances to obstacles in the surroundings of the vehicle and the position of these obstacles in the surroundings of the vehicle. For accurately determining the position of the obstacles, program-controlled device 11 may also make use of the triangulation principle, the distance values ascertained by the different sensors being adjusted to each other. Program-controlled device 11 also ascertains whether or not the objects in the vehicle's surroundings may be driven over. This is elucidated in greater detail in the following.

Program-controlled device 11 may also be designed for ascertaining a suitable parking space and optionally to determine a driving trajectory and final position in this parking space. In addition, it preferably also determines outputs to the driver. Program-controlled device 11 is connected to a warning signal device for output, which may be designed as display 12 and/or speaker 13. Display 12 may be designed, in particular, as a screen of a navigation display in the vehicle. Furthermore, instructions may also be output via a display in a combination instrument, via a head-up display, or via LED displays, which are to be additionally installed on the dashboard. Instructions may be output with the aid of display 12 and/or speaker 13, for example, informing the driver that the vehicle is moving toward an obstacle that may not be driven over. To ascertain a movement or also the velocity of the vehicle, program-controlled device 11 may also be connected to a velocity and steering angle sensor 14.

Figure 2:
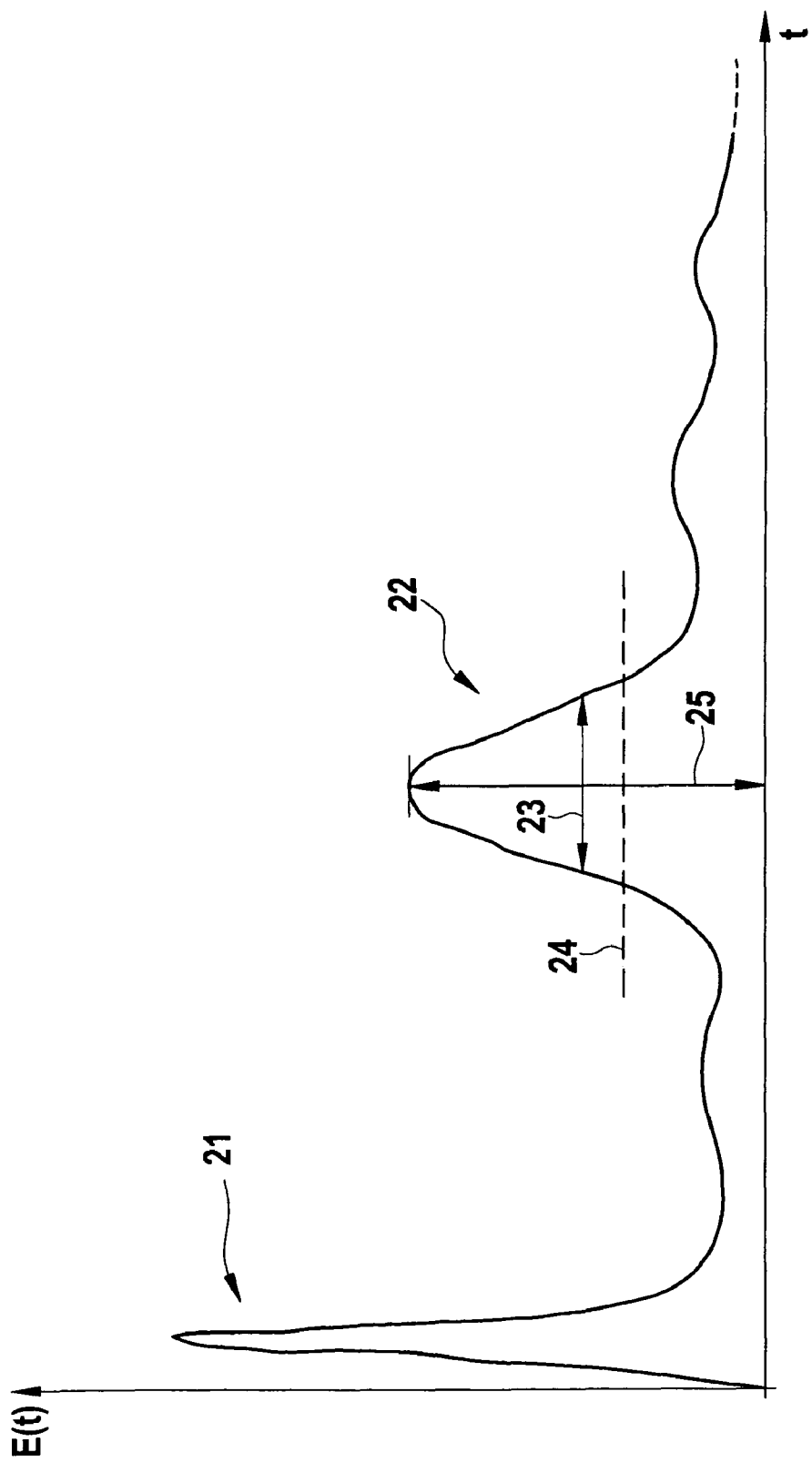
FIG. 2 shows the envelope of the signal curve of the sensor signal output by one of the distance sensors situated in the rear end as a function of time.

FIG. 2 shows, as an example, signal curve E(t) of the envelope of a sensor signal output by distance sensors 5 situated in the rear end as a function of time t for the case where the vehicle is moving, when parking in reverse, with its rear end toward an obstacle (object) that may not be driven over, such as, for example, a wall. The signal reflected by the wall is received by distance sensor 5 and converted into an electrical sensor signal by a suitable converter (for example, an ultrasonic transducer) of the distance sensor. FIG. 2 shows a typical signal curve of the envelope having a so-called initial crosstalk 21. An echo pulse 22 reflected by an obstacle indicates that there is an object in the measuring lobe of sensor 5.

In the so-called echo signal method, the time period from the emission of the signal to the appearance of echo pulse 22 corresponds to the distance of the object thus scanned from the transmitter (distance sensor). The time from the emission of the ultrasound pulse to the appearance of echo pulse 22 thus corresponds (due to the back and forth propagation time) to twice the time needed by a pulse for traveling the distance between the sensor and the obstacle. By locating the start of the pulse, program-controlled device 11 may thus ascertain the distance to an obstacle located in the measuring lobe of the distance sensor.

The shape of pulse 22 is characterized by several characteristic quantities, thus, for example, by amplitude 25 of pulse 22, its half-value width 23, or the width of the pulse in relation to a (possibly time-variable) threshold value 24. These characteristic quantities are functions of the shape and structure of objects, i.e., in particular of their height, and of the distance between sensor 5 and the object. The following discussion is based on pulse amplitude 25 (characteristic quantity A) as the characteristic quantity; however, it is also possible to use one or more other quantities as the characteristic quantities.

FIGS. 3A through 3D show the variation of a characteristic quantity A measured by one of sensors 5 as a function of time in the case where vehicle 1 moves at a constant speed toward an obstacle.

Figure 3A:
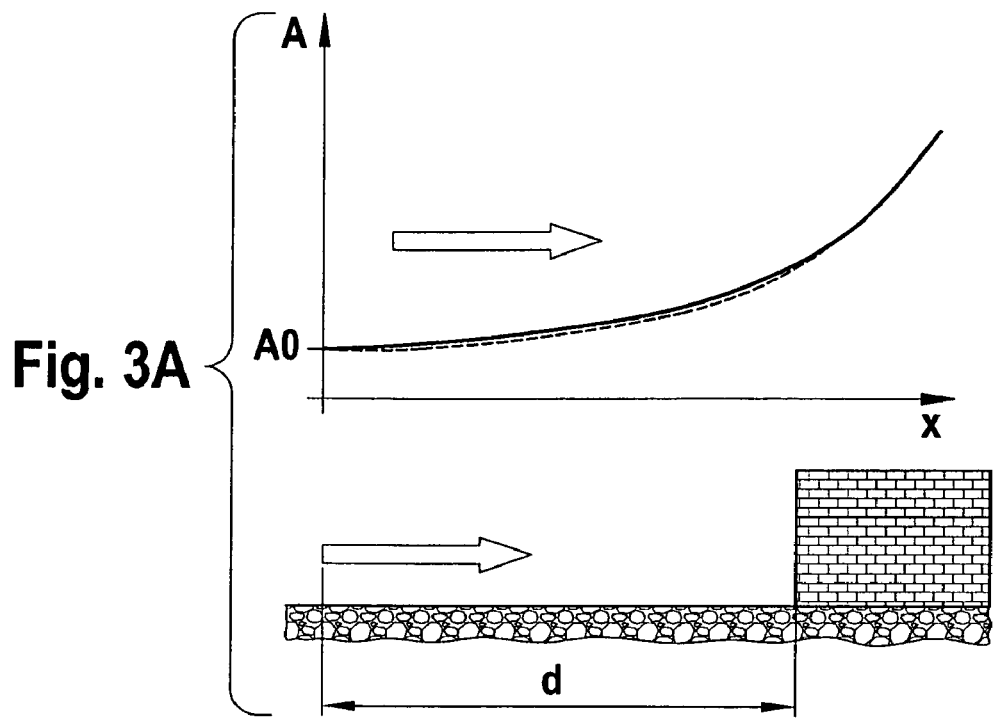
FIGS. 3A through 3D show the variation of characteristic quantity A measured by the sensor as a function of time in the case where the vehicle moves at a constant speed toward an obstacle.

FIG. 3A shows at the top a graph which schematically represents the variation of characteristic quantity A over the location in the case where vehicle 1 moves in the direction of the arrow toward an obstacle that may not be driven over (for example, a wall or another vehicle), as schematically shown at the bottom of FIG. 3A. The distance to the obstacle decreases over time. At the same time, amplitude A increases, essentially exponentially, so that the following formula (1) applies:

$$A(x) \approx A0 \cdot e^{kx} \quad (1)$$

where A0 is the characteristic quantity at a certain distance d and x is the distance traveled by vehicle 1 from location x>1 toward the object. k is an attenuation factor which may be a function of the transmission medium, and thus of the weather conditions (such as temperature, atmospheric pressure, precipitation). Therefore, as vehicle 1 approaches the obstacle, characteristic quantity A increases exponentially with decreasing distance to the obstacle. The variation of characteristic quantity A corresponds to a reference curve 30 (see, for example, FIGS. 3B through 3D).

Figure 3B:
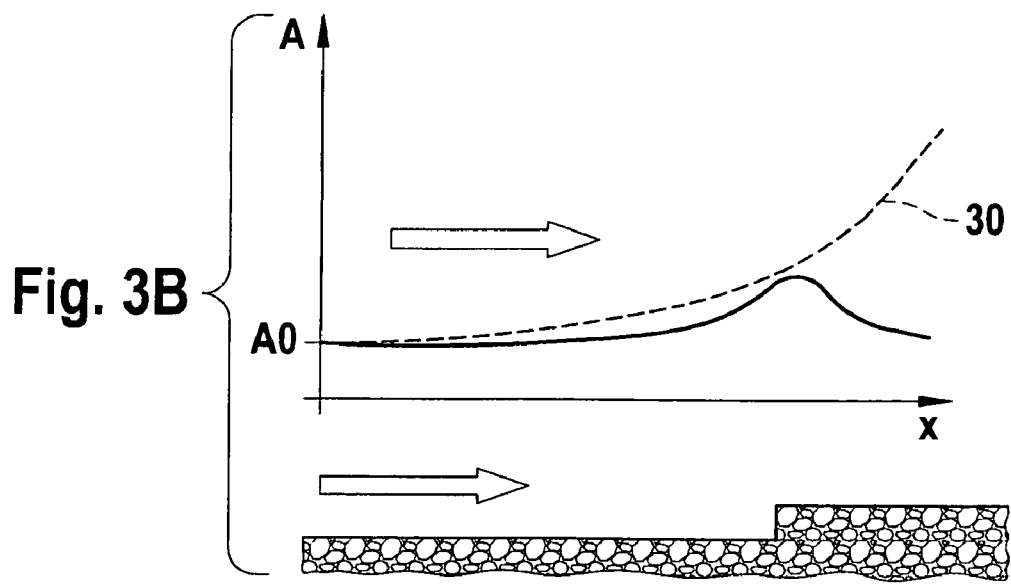

FIG. 3B shows at the top a graph which schematically represents the variation of characteristic quantity A over the location in the case where vehicle 1 moves toward an obstacle that may be driven over (for example, a curb), as schematically shown at the bottom of FIG. 3B.

Also in this case, characteristic quantity A increases exponentially with decreasing distance between the vehicle and the obstacle, however, not as rapidly as in the case illustrated in FIG. 3A. Characteristic quantity A thus remains below reference curve 30 drawn with a dashed line. This is due to the shape of the obstacle, which reflects most of the signal emitted by sensor 5 in a direction in which it may no longer be detected by sensor 5. The signal detected by sensor 5 therefore corresponds to only a relatively small portion of the signal reflected by the top edge of the obstacle. Furthermore, characteristic quantity A increases only to a local maximum from which it then decreases. This decrease of characteristic quantity A is due to the shape of the measuring lobe. The measuring lobe expands in the shape of a cone from sensor 5. Consequently, sensor 5 may detect objects that are very close to the vehicle only if they have a certain height. In other words, if sensor 5 is too close to a low object, the sensor "looks" away over the object and is no longer able to detect it.

Figure 3C:
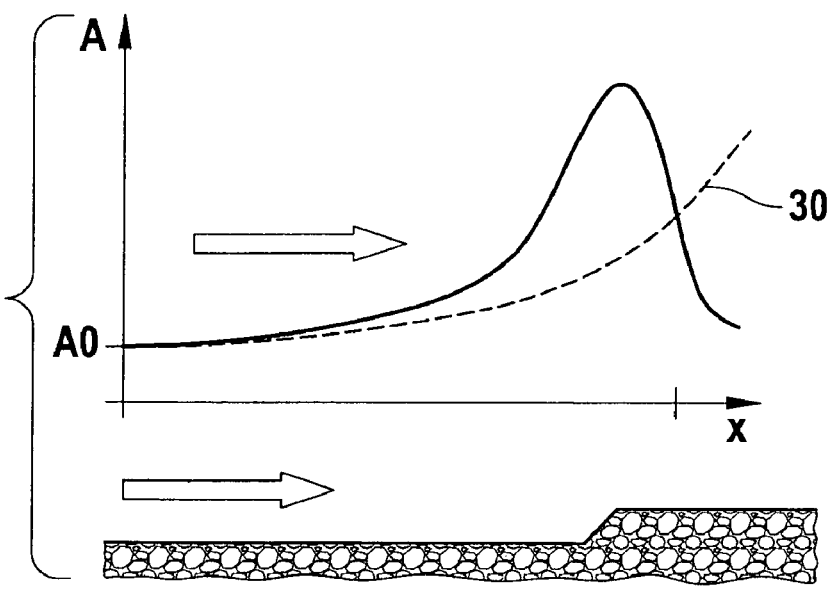

FIG. 3C shows at the top a graph which schematically represents the variation of characteristic quantity A over the location in the case where vehicle 1 moves toward an obstacle that may be driven over (for example, a curb), as schematically shown at the bottom of FIG. 3C.

A local maximum, appearing for the reasons presented for FIG. 3B, is also apparent from FIG. 3C. However, the graph shown in FIG. 3C differs from the graph shown in FIG. 3B in that characteristic quantity A lies above reference curve 30 drawn in a dashed line for greater distances (i.e., smaller values of x). This is again due to the shape of the obstacle. If the obstacle is a sloped curb as shown in FIG. 3C, then the obstacle has a relatively large surface which is almost perpendicular to the direction of propagation of the signal emitted by sensor 5. Consequently, the obstacle has a large back-scattering cross-section, which results in greater reflected portions.

Figure 3D:
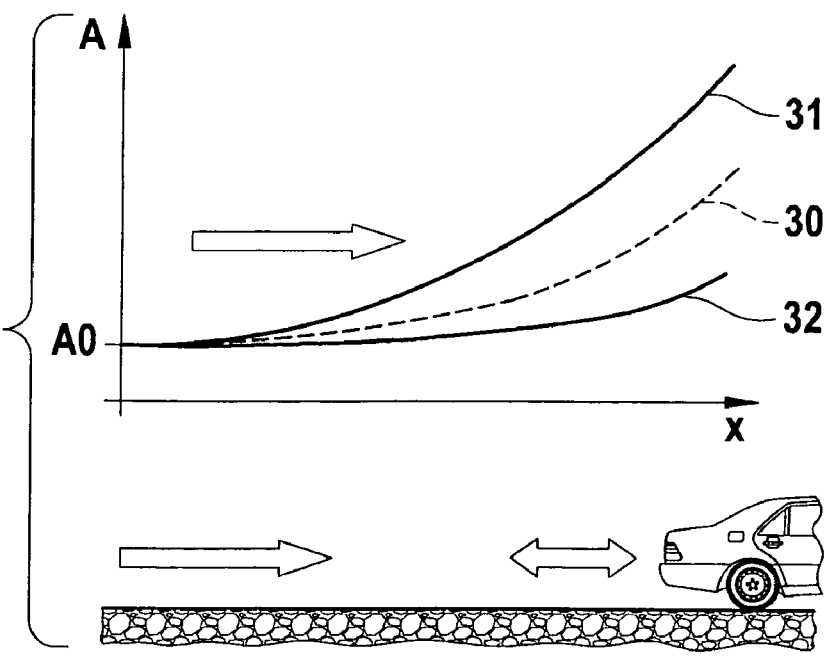

Finally, FIG. 3D shows at the top a graph which schematically represents the variation of characteristic quantity A over the location in the case where vehicle 1 moves toward a self-propelled obstacle that may not be driven over (for example, another vehicle), as schematically indicated at the bottom of FIG. 3D.

It should be pointed out again here that variable x is not necessarily a function of actual distance d to the obstacle, but only provides distance x traveled by vehicle 1 from a certain initial position. Furthermore, FIG. 3D is based on the assumption that vehicle 1 moves at a constant velocity. If the obstacle is self-propelled and moves (additionally to the movement of vehicle 1) toward vehicle 1, then characteristic quantity A has the variation curve as in top graph 31 and lies above reference curve 30.

If now the obstacle is self-propelled and moves (additionally to the movement of vehicle 1) away from vehicle 1, then characteristic quantity A has the variation curve as in bottom graph 32 and lies below reference curve 30. Bottom graph 32, however, represents the case where vehicle 1 is still moving toward the obstacle or, in other words, the velocity of the obstacle is lower than that of vehicle 1. If the obstacle moves faster than vehicle 1 and in the same direction, then the characteristic quantity decreases with increasing x (not shown here).

Figure 4:
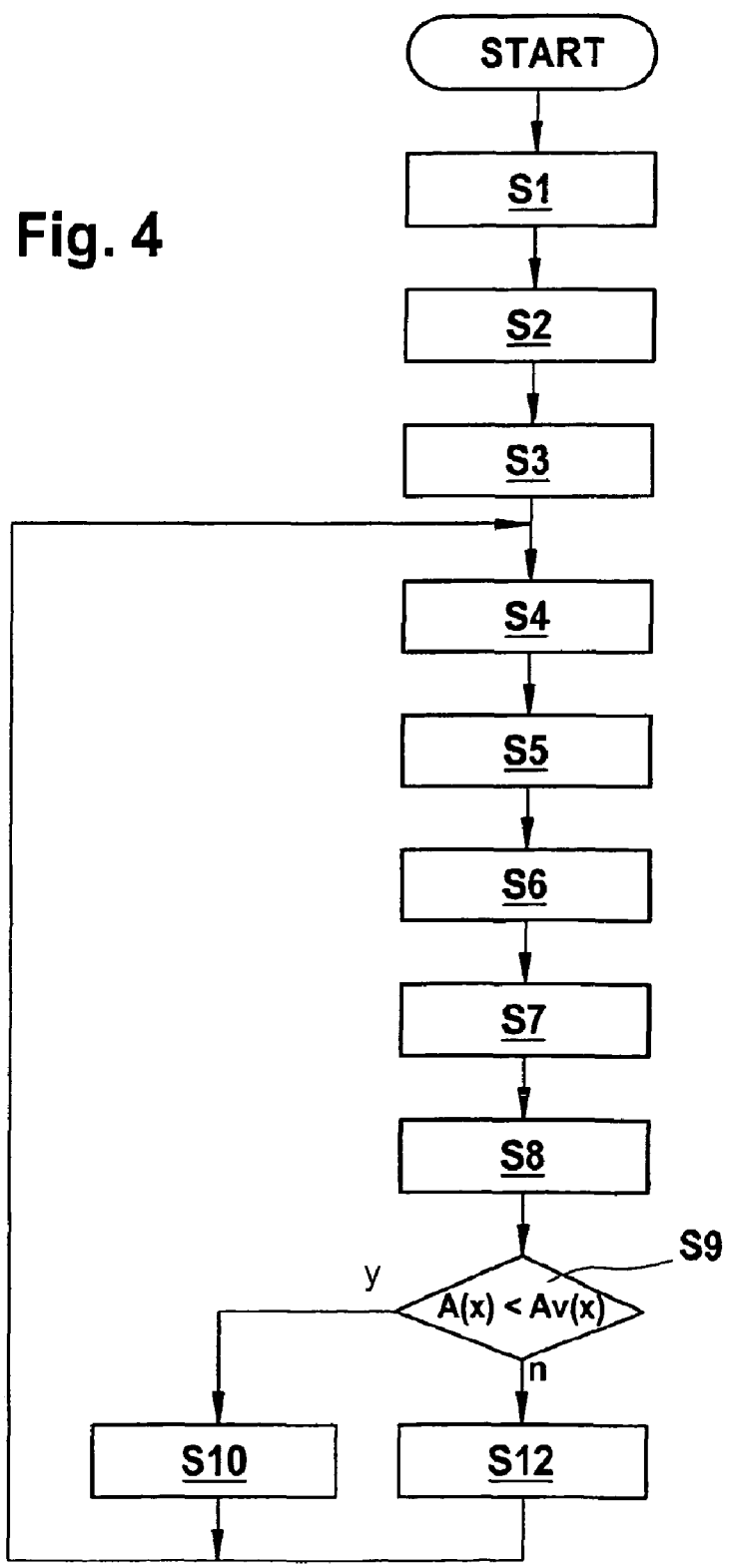
FIG. 4 shows a flow chart of a first exemplary embodiment of an object classification method.

On the basis of these preliminary considerations, it is now possible to construct a method and a system which make improved classification of objects toward which vehicle 1 moves during the parking operation possible. FIG. 4 shows a flow chart of a first exemplary embodiment of an object classification method within a parking assistance method for supporting a parking operation which may be performed by the above-described parking assistance system.

In step S1, at least one of sensors 3 or 5 transmits a signal in the direction of travel when parking, i.e., one of sensors 5 when parking in reverse or one of sensors 3 when parking moving forward. In the following it will be assumed that vehicle 1 is being parked in reverse and the rear end of vehicle 1 is approaching the obstacle at a known velocity. The received signals of sensor 5 are thus relevant and, in the present example, the analysis of the received signals of one of sensors 5 will be described.

In step S2, sensor 5 receives the signal reflected by the object and forwards the received signal to program-controlled device 11.

In step S3, program-controlled device 11 subjects the received signal (more accurately, the envelope of the received signal) to signal processing and ascertains an (actual) characteristic quantity A0 from the received signal. In the present case, the characteristic quantity is amplitude 25 of first echo pulse 22.

Steps S4 through S6 essentially correspond to steps S1 through S3. This means that in step S4, sensor 5 again transmits a signal and in step S5 sensor 5 receives the signal reflected by the object, whereupon, in step S6, a characteristic quantity A is ascertained from the received signal.

In Step S7, program-controlled device 11 ascertains distance x, which vehicle 1 has traveled between steps S2 and S6. This may be achieved by integrating a velocity signal output by velocity sensor 14 over time.

In step S8, program-controlled device 11 ascertains a predictive quantity Av from distance x ascertained in step S7 and from characteristic quantity A0 ascertained in step S3, according to the following formula (2):

$$Av = A0 \cdot e^{kx} \quad \text{Formula (2)}$$

where k represents the above-described attenuation factor.

In step S9, program-controlled device 11 compares this predictive quantity Av with actual characteristic quantity A ascertained in step S6. If predictive quantity Av is less than actual characteristic quantity A, the method jumps to S10. However, if predictive quantity Av is greater than or equal to actual characteristic quantity A, the method jumps to S12.

In step S10, program-controlled device 11 generates an object classification signal having a first state, while in step S12 program-controlled device 11 generates an object classification signal having a second state. First and second states differ, for example, by their signal levels. The object classification signal may be further processed internally by program-controlled device 11. In particular, it may be used for deciding whether and which warning instructions are output to the user. For example, program-controlled device 11 may be configured such that, during a parking operation in reverse it outputs a warning signal if the distance between vehicle 1 and an object located behind the vehicle and detected by sensors 5 is less than a certain warning distance. This warning distance may depend on whether or not the object is classified as an object that may be driven over (i.e., when an object classification signal of the first state is output) or as an object that may not be driven over (i.e., when an object classification signal of the second state is output). For example, the warning distance in the case of objects that may be driven over may be configured longer by a certain length, thus taking into account that at least the rear end of vehicle 1 may protrude over low objects without danger.

After step S10 or S12, the procedure returns to step S4 and steps S4 through S10/S12 are repeated.

The above-described method thus makes a reliable classification of objects into objects that may and objects that may not be driven over possible. Attention must be paid to the fact that in the above-described method, in cases of doubt, objects are initially classified as objects that may not be driven over. Such is the case, for example, at the beginning of the situation illustrated in FIG. 3C. Although this is an object that may be driven over (inclined curb), the curve for relatively small values of x is similar to curve 31 in FIG. 3D for a self-propelled object that may not be driven over. An object is not classified as an object that may be driven over until the point in time where amplitude A(x) drops below predictive quantity 30. This ensures that an object that may not be driven over is not erroneously classified as an object that may be driven over.

Figure 5:
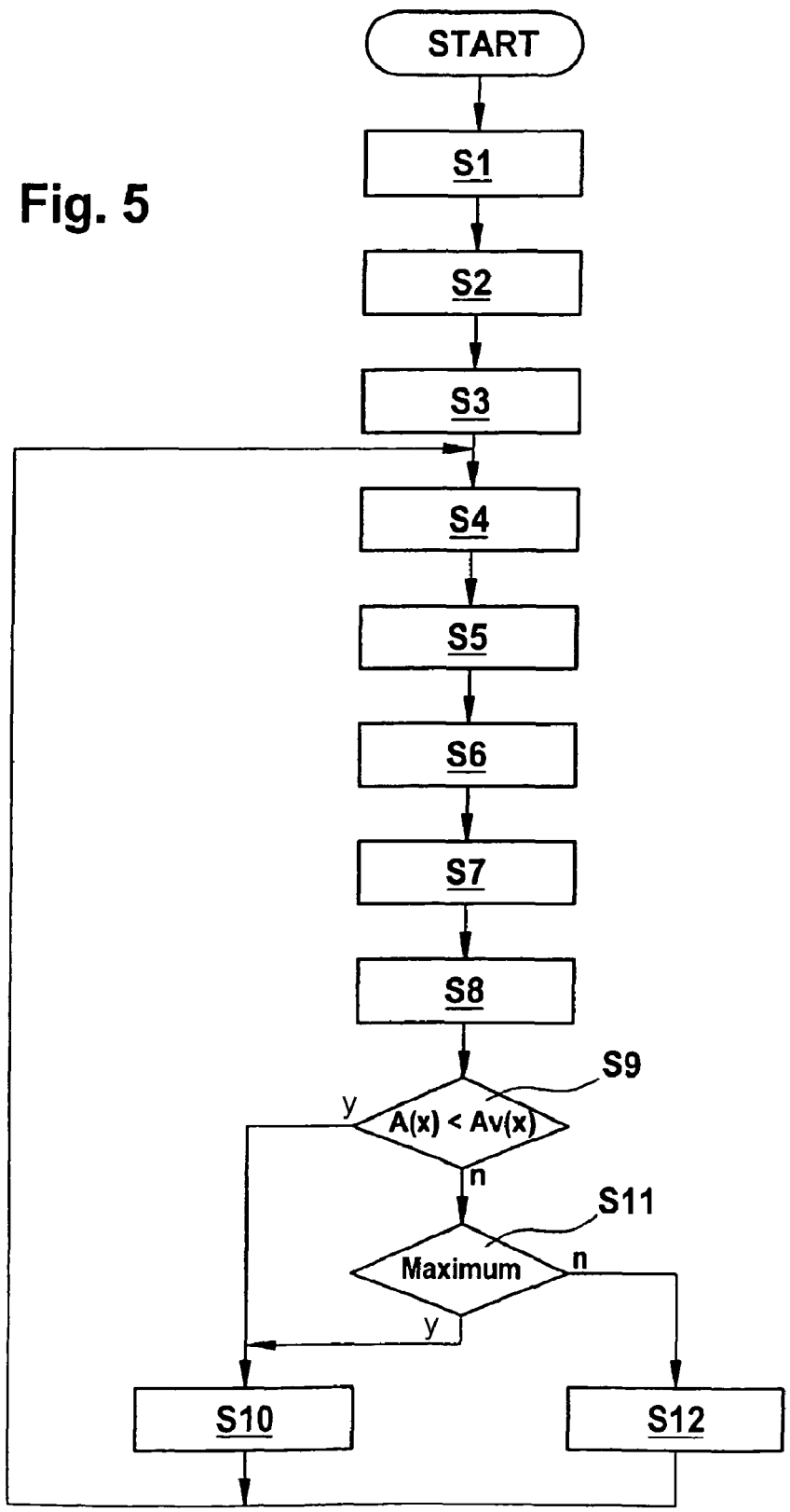
FIG. 5 shows a flow chart of a second exemplary embodiment of an object classification method.

FIG. 5 shows a method according to a second exemplary embodiment, which represents a refinement of the first exemplary embodiment. Steps S1 through S9 of this exemplary embodiment correspond, in this second exemplary embodiment, to the above-described steps S1 through S9, so that only reference is being made here to the previous explanations. If, in step S9, predictive quantity Av is greater than or equal to actual characteristic quantity A, the method jumps to S11. In step S11, program-controlled device 11 ascertains whether the curve of characteristic quantity A(x) has a local maximum, i.e., whether it corresponds to the curve of characteristic quantity A(x) in FIG. 3B or 3C. A local maximum may be determined, for example, by comparing the instantaneous characteristic quantity to the previous characteristic quantity or to the characteristic quantity ascertained at a certain preceding point in time. The existence of a local maximum may be confirmed if the difference between these two characteristic quantities is less than a certain minimum difference.

The existence of a local maximum indicates that the object may be driven over, so that, if there is a local maximum, the procedure jumps to step S10 where a corresponding object classification signal is output. If no local maximum is ascertained, the procedure jumps to step 12, where a corresponding object classification signal is output.

According to this second exemplary embodiment, in the case of the scenario illustrated in FIG. 3C, the object is correctly classified as an object that may be driven over even shortly before the appearance of the local maximum of characteristic quantity A(x), while in the first exemplary embodiment the object is not classified as an object that may be driven over until the point in time where the value of characteristic quantity A drops below predictive quantity 30.

Although the present invention was described above with reference to preferred exemplary embodiments, it is not limited thereto, but may be modified in many ways.

For example, distance sensors 3, 5, 8, 9 were described as ultrasound sensors. It is, however, possible to use other types of sensors (such as, for example, radar sensors, lidar sensors) as long as they are based on a distance-measuring method.

Furthermore, according to the above-described exemplary embodiments, the classification into objects that may and objects that may not be driven over is performed only on the basis of the analyzed characteristic quantity. It is, however, possible to use additional information for the classification and, for example, to perform a plausibility check of the classification.

Furthermore, the order of the steps in the above exemplary embodiments is only exemplary and may be varied. For example, the traveled distance x may also be ascertained before pulses are transmitted.

Furthermore, the above object classification method was elucidated in connection with a parking assistance method; however, it may also be used for other assistance functions such as, for example, driving-off assistance, parking stop, or maneuvering assistance in narrow streets.

What is claimed is:

1. An object classification method for classifying an object during a parking operation involving movement of a vehicle toward the object, comprising:
   (a) ascertaining a first characteristic quantity from a variation of a first signal received by a distance-measuring sensor in the vehicle;
   (b) ascertaining a second characteristic quantity from a variation of a second signal received by the distance-measuring sensor;
   (c) ascertaining a distance traveled by the vehicle between step (a) and step (b);
   (d) ascertaining a predictive quantity from the ascertained first characteristic quantity, wherein the predictive quantity is associated with the distance ascertained in step (c);
   (e) comparing the predictive quantity with the second characteristic quantity ascertained in step (b); and
   (f) generating an object classification signal associated with the object, wherein the object classification signal has a first state if the predictive quantity is less than the second characteristic quantity or a second state if the predictive quantity is greater than or equal to the second characteristic quantity.

2. The method as recited in claim 1, wherein steps (b) through (f) are repeated periodically.

3. The method as recited in claim 2, further comprising:
ascertaining whether a series of consecutively ascertained characteristic quantities has a local maximum,
wherein the object classification signal associated with the object is generated to have the first state if the series of consecutively ascertained characteristic quantities has a local maximum.

4. The method as recited in claim 1, wherein in step (d) the predictive quantity is ascertained by mathematically linking the first characteristic quantity to an attenuation factor.

5. The method as recited in claim 4, wherein in step (d) the predictive quantity is determined by multiplying the first characteristic quantity ascertained in step (a) by a factor $e^{kx}$, k being the attenuation factor and x being the distance ascertained in step (c).

6. The method as recited in claim 5, wherein the attenuation factor k is set as a function of weather conditions.

7. The method as recited in claim 1, wherein the first characteristic quantity defines the amplitude of a local maximum in the first signal received by the sensor, and wherein the second characteristic quantity defines the amplitude of a local maximum in the second signal received by the sensor.

8. The method as recited in claim 1, further comprising:
determining an instantaneous distance of the vehicle from the object; and
outputting a warning signal if the instantaneous distance is less than a predetermined minimum distance, wherein the predetermined minimum distance is a function of the state of the object classification signal.

9. A non-transitory computer-readable storage medium storing a computer program having program codes which, when executed on a computer, control a method of classifying an object during a parking operation involving movement of a vehicle toward the object, the method comprising:
 (a) ascertaining a first characteristic quantity from a variation of a first signal received by a distance-measuring sensor in the vehicle;
 (b) ascertaining a second characteristic quantity from a variation of a second signal received by the distance-measuring sensor;
 (c) ascertaining a distance traveled by the vehicle between step (a) and step (b);
 (d) ascertaining a predictive quantity from the ascertained first characteristic quantity, wherein the predictive quantity is associated with the distance ascertained in step (c);
 (e) comparing the predictive quantity with the second characteristic quantity ascertained in step (b); and
 (f) generating an object classification signal associated with the object, wherein the object classification signal has a first state if the predictive quantity is less than the second characteristic quantity or a second state if the predictive quantity is greater than or equal to the second characteristic quantity.

10. A parking assistance system for aiding a parking operation of a vehicle involving movement of the vehicle toward an object, comprising:
a distance-measuring sensor configured to periodically transmit a signal from the vehicle toward the object and receive a reflected signal from the object; and
a program-controlled device configured to:
 ascertain a first characteristic quantity from a variation of a first signal received by the distance-measuring sensor;
 ascertains a second characteristic quantity from a variation of a second signal received by the distance-measuring sensor;
 ascertain a distance traveled by the vehicle between the points in time when the first and the second characteristic quantities are ascertained;
 ascertain a predictive quantity from the first ascertained characteristic quantity, wherein the predictive quantity is associated with the ascertained distance traveled by the vehicle;
 compares the predictive quantity with the second characteristic quantity; and
 generate an object classification signal associated with the object, wherein the object classification signal has a first state if the predictive quantity is less than the second characteristic quantity or a second state if the predictive quantity is greater than or equal to the second characteristic quantity.

11. The parking assistance system as recited in claim 10, wherein the distance-measuring sensor is located in one of a rear area or a front area of the vehicle.

* * * * *